US005153616A

United States Patent [19]

Asanae et al.

[11] Patent Number: 5,153,616

[45] Date of Patent: Oct. 6, 1992

[54] METHOD FOR RECORDING IMAGES

[75] Inventors: Masumi Asanae, Kumagaya; Fumio Kimura, Isesaki, both of Japan

[73] Assignee: Hitachi Metals, Ltd., Tokyo, Japan

[21] Appl. No.: 665,476

[22] Filed: Mar. 6, 1991

[30] Foreign Application Priority Data

Mar. 8, 1990 [JP] Japan .................................... 2-57697

[51] Int. Cl.$^5$ ...................... G01D 15/06; G03G 9/083

[52] U.S. Cl. ................................ 346/153.1; 430/106.6

[58] Field of Search ................... 346/153.1; 430/106.6

[56] References Cited

U.S. PATENT DOCUMENTS

| | | | |
|---|---|---|---|
| 3,639,245 | 2/1972 | Nelson | 252/62.1 |
| 3,816,840 | 6/1974 | Kotz | 346/74 ES |
| 4,189,390 | 2/1980 | Noguchi et al. | 430/111 |
| 4,482,623 | 11/1984 | Tabaru et al. | 430/137 |
| 4,873,540 | 10/1989 | Asanae et al. | 346/153.1 X |

*Primary Examiner*—George H. Miller, Jr.
*Attorney, Agent, or Firm*—Finnegan, Henderson, Farabow, Garrett & Dunner

[57] ABSTRACT

A method for recording images includes:

arranging a recording medium which is composed of a substrate and an insulating layer provided on the surface thereof and yet constituted movably, and a recording electrode in spaced opposing relationship to provide a recording region between the insulating layer and recording electrode, selecting supplying to the recording region, a magnetic toner having a bulk resistance of $10^6$ Ω.cm or less and a surface resistance of $10^5$ to $10^{15}$ Ω.cm produced by adding particles of a conductive material to magnetic toner particles comprising a fixing resin and magnetic powders fixing the particles of the conductive material to the surface of the toner particles, and then further adding thereto a resin and fixing it to the surface of the toner particles to the surface of which the particles of the conductive material is fixed, and applying electrical signals corresponding to an image to the recording electrode to form the image composed of the toner on the surface of the recording medium. According to this method, high-quality images of both deep density and high resolution degree, free from bleeding and fogging and yet of good fixability can be obtained.

8 Claims, 1 Drawing Sheet

METHOD FOR RECORDING IMAGES

BACKGROUND OF THE INVENTION

The present invention relates to a method for forming a developed image composed of a toner, the magnetic toner directly on the surface of a recording medium, using a large number of needle electrodes in accordance with electrical signals corresponding to the image.

Among the conventional image-forming methods with electro-photographic apparatus, the most general method is one which comprises using as an image carrier, for example, a photosensitive drum, uniformly charging the surface of the drum by a corona-charging means, exposing the drum to light to form an electrostatically charged image on the surface thereof, developing the image with a magnetic developer by the magnetic brushing method, etc., transferring the developed image to a recording member and then fixing the transferred image.

In recent years, however, a means has been proposed in which visible images composed of a toner are formed directly on a recording medium comprising Alumite or other materials by means of plural number of needle electrodes without using the foregoing photosensitive drum (for example refer to U.S. Pat. No. 3,816,840). For example, the outer surface of an aluminum drum is covered with Alumite layer of about 10 μm in thickness, a permanent magnet is provided near to the inner surface of the drum, and a toner container containing conductive magnetic toner is arranged over the outer surface of the drum so that it faces the foregoing permanent magnet. At a part of the toner container are provided a magnetic blade and plural number of needle electrodes so that they face the toner and permanent electrode. Toner chains are formed between the Alumite layer and needle electrodes by the action of magnetic field of the permanent magnet, and a part of the toner chains is brought into contact with the Alumite layer. In a system constituted as above, when electrical signals corresponding to an image, for example, pulse voltage of about 50 V are selectively applied to plural number of the needle electrodes, coulomb force acts on the toner in contact with the Alumite layer. When the drum is rotated while the coulomb force is acting, the toner selectively adheres to the Alumite layer constituting the outer surface of the drum, thus developing is carried out. Consequently, a copied image can be obtained thereafter by electrostatically transferring the developed image to plain paper, etc. by a usual means and fixing the transferred toner image.

When the visible image composed of the toner is directly developed on the, dielectric as described above, various problems are caused by using the conventional magnetic toners as they are. For example, when conductive magnetic toners (for example refer to U.S. Pat. Nos. 3,639,245, 4,189,390 and 4,482,623) are used, because of their resistance value (bulk resistance) being low, for example, about $10^2$ to about $10^8$ Ω.cm, there is a problem of the image bleeding at the time of transferring. On the other hand, when semiconductive or insulating magnetic toners are used, because of their resistance value being high, for example, about $10^9$ to about $10^{16}$ Ω.cm, there is a problem of the image density being low at the time of developing. Also, it is thought to reduce the internal resistance by incorporating conductive fine particles such as carbon black into the particles of the high-resistance magnetic toners. In this case, however, there is a necessity to incorporate a large quantity of carbon black, and so there is a problem of the property of fixing images (hereinafter referred to as fixability) being remarkably deteriorated.

As described in U.S. Pat. No. 4,873,540, therefore, it is proposed to use a magnetic toner comprising conductive fine particles and an insulating substance which adheres to the surface of toner particles. High-quality images are obtained by using this magnetic toner, but a further improvement in the fixability is desired.

SUMMARY OF THE INVENTION

An object of the present invention is to solve problems of the prior arts to provide a recording method by which images of both high density and high resolution degree, free from bleeding and fogging and improved in the fixability, can be obtained.

In order to attain the above object, the present inventors have made an extensive study, and as a result have found that the above object can be attained by using a magnetic toner having bulk resistance and surface resistance which are in a particular range.

According to the present invention, there is provided a method for recording images comprising:

(a) arranging a recording medium which is composed of a substrate and an insulating layer provided on the surface thereof and yet constituted movably, and a recording electrode in spaced opposing relationship to provide a recording region between the insulating layer and recording electrode, (b) supplying to the recording region a magnetic toner having a bulk resistance of $10^6$ Ω.cm or less and a surface resistance of $10^5$ to $10^{15}$ Ω.cm produced by adding particles of a conductive material to magnetic toner particles comprising a fixing resin and magnetic powder to fix the former particles to the surface of the latter particles, and then further adding a resin to fix it to the surface of the former particles fixed to the latter particles, and (c) applying electrical signals corresponding to an image to the recording electrode to form the image composed of the toner on the surface of the recording medium.

In the method described above, said resin is added, in the form of powder or solution, to the magnetic toner particles to the surface of which the conductive material has been fixed, and then fixed to the surface thereof.

DETAILED DESCRIPTION OF THE INVENTION

Figure 1:
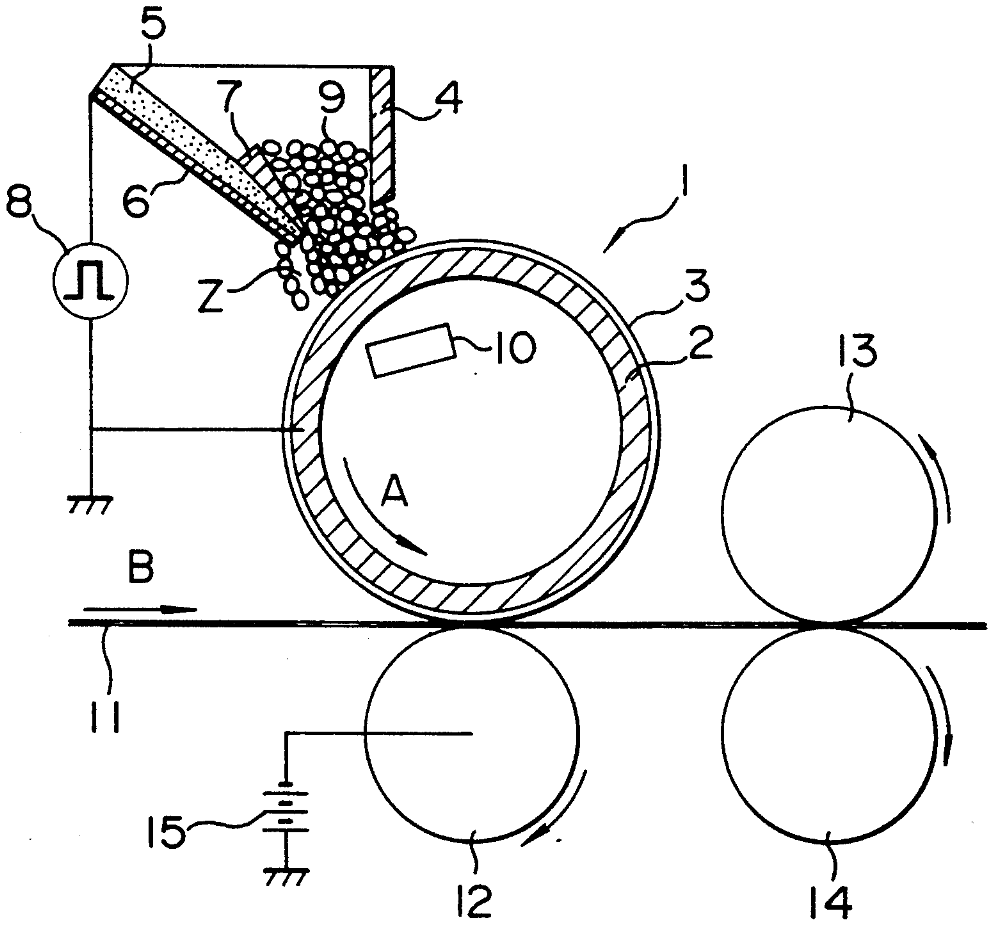
FIG. 1 shown later is a transverse sectional view of one embodiment of an image-forming apparatus used to practice the method of the present invention.

A reason why the bulk resistance and surface resistance of the magnetic toner used in the present invention are limited to the particular range will be illustrated below.

In the course of developing, current flows through the toner chain (which provides an electric circuit) formed by the magnetic field to allow the magnetic toner to adhere to the recording member, so that the lower the bulk resistance, the better the developing of the toner. On the other hand, in the course of electrostatic transferral of the toner image formed on the recording member, the magnetic toner is attracted to transfer paper electric charge supplied to the transfer paper. In other words, at the time of transferral, the electric chargeability property alone of the surface of the magnetic toner particles makes a substantial contribution to the transferral. This charge-accepting property depends largely upon the surface resistance of the magnetic toner. As a consequence, a good transferral is not attained unless the surface resistance is high to some degree. Considering both the developing and transferral, therefore, it is necessary to limit the bulk resistance to $10^6$ Ω.cm or less and the surface resistance to a range of $10^5$ to $10^{15}$ Ω.cm. A preferred range of the bulk resistance is $10^3$ to $10^5$ Ω.cm, and that of the surface resistance is $10^6$ to $10^{13}$ Ω.cm, and a more preferred range of the surface resistance is $10^7$ to $10^{13}$ Ω.cm.

In order to cause both the bulk resistance and surface resistance to possess such values as described above, the following methods are employed. When the resin added to the magnetic toner particles is used in the form of powder, it is desirable that the particles of the conductive material and the resin be added in amounts of 0.3 to 4 parts by weight and 0.05 to 2.0 parts by weight, respectively, based on 100 parts by weight of the magnetic toner particles. On the other hand, when said resin described above is used in the form of solution, it is desirable that the particles of conductive material and the resin be added in amounts of 0.3 to 4.0 parts by weight and 0.1 to 1 part by weight, respectively, based on 100 parts by weight of the magnetic toner particles.

When fixing is carried out by a heat-fixing method with an oven or heat-roller, the fixing resin contained in the toner particles includes the following thermoplastic polymers : Homopolymers obtained by polymerizing monomers such as styrenes, vinyl esters, α-methylene aliphatic monocarboxylic acid esters, acrylonitrile, methacrylonitrile, acrylamide, vinyl ethers, vinyl ketones, N-vinyl compounds, etc.; copolymers obtained by coppolymerizing two or more of these monomers; and mixtures thereof. Further, non-vinyl type thermoplastic resins such as bisphenyl-type epoxy resins, oil-modified epoxy resins, polyurethane resins, cellulosic resins, polyether resins, polyester resins, etc. and mixtures of these thermoplastic resins and the foregoing vinyl-type thermoplastic resins can also be used.

When fixing is carried out by the pressure-fixing method, for example, the following pressure-sensitive resins are used as the fixing resin : Higher fatty acids, higher fatty acid derivatives, higher fatty acid amides, waxes, rosin derivatives, alkyd resins, epoxy-modified phenol resins, natural resin-modified phenol resins, amino resins, silicone resins, urea resins, copolymerized oligomers of acrylic acid or methacrylic acid with a long-chain alkyl methacrylate or long-chain alkyl acrylate, polyolefins, ethylene/vinyl acetate copolymers, ethylene/vinyl alkyl ether copolymers, maleic anhydride series copolymers, etc.

These resins can be selected optionally, and also used in any combination of two or more of them. However, in order to prevent reduction of the flowability of the toner produced therefrom, use of the resins having a glass transition point exceeding 40° C. or a mixture of such resins is effective with the exception of polyolefin resins.

Next, as the resin to be added and fixed to the surface of the toner particles, resins having the same or approximately the same fixability as that of the above fixing resins are preferably used. Specifically, those which are mentioned as the fixing resins, and the like can be used.

When the resin to be added and fixed to the surface of the toner particles is used in the form of powder, its particle size needs to be smaller than that of the toner particles. Specifically, it is preferably 0.01 to 2.0 μm, more preferably 0.03 to 1.0 μm in the average particle size. When the average particle size is too small, the resin is so bulky that treatment operation becomes troublesome, which is disadvantageous for production. On the other hand, when the average particle size is too large, uniform addition and fixation of the resin to the surface of the toner particles become difficult, which is not desirable.

The resin powder used in the present invention includes polymers obtained by various polymerization methods, for example, as described in Japanese Patent Application Kokai No. 60-186852. That is, to say nothing of particle-form polymers obtained by emulsion polymerization, soap-free emulsion polymerization, suspension polymerization, etc., those which are obtained by producing a polymer by the foregoing various polymerization methods, solution polymerization or bulk polymerization, dissolving the polymer in a solvent and granulating the polymer by spray-drying the resulting solution, can also be used.

Alternatively, the particles of the conductive material may be adhered to the surface of the toner particles, which are then coated with a resin having the same or approximately the same fixability as that of the fixing resin. Coating with the resin is carried out, for example, by dissolving the resin in an organic solvent, and blowing the resulting solution against the surface of the toner particles by means of a spray-dryer, or mixing this solution and the toner particles and stirring the mixture with deaerating. The amount of the coating resin is preferably in a range of 0.1 to 1 part by weight based on 100 parts by weight of the toner particles. When this amount is too small, sufficient effect on fixability cannot be obtained, and when it is too large, the bulk resistance becomes too high, which results in reduction of the image density.

As the magnetic powder, metal elements having ferro-magnetism such as iron, cobalt, nickel, etc. and compounds or alloys containing these metal elements can be used Specifically, ferrite, magnetite, etc, can be mentioned. In order to uniformly disperse the above magnetic powder in the magnetic toner, it is desirable that the average particle size of the magnetic powder is 0.01 to 3 μm. The content of the magnetic powder is preferably 10 to 80 wt. %, more preferably 40 to 75 wt. % based on the weight of the magnetic toner particles.

As components other than those described above, various additives (e.g. pigments, dyes, etc.) used in general dry developers may be incorporated into the magnetic toner. In order to prevent reduction of the fixability, the amount of the additives added is preferably 10 wt. % or less based on the total weight of the magnetic toner.

The magnetic toner used in the present invention is produced, for example, as follows : First, the magnetic powder and the fixing resin are kneaded with heating, cooled to solidify, pulverized and classified to obtain magnetic toner particles of predetermined particle size. Particles comprising the conductive substance are added to the magnetic toner particles and then fixed to the surface thereof by heat treatment. Thereafter, the resin powder is added and fixed by heat treatment to the surface of the magnetic toner particles, to which the conductive substance is fixed.

DESCRIPTION OF PREFERRED EMBODIMENTS

Examples 1 to 10 and Comparative Examples 1 and 2

FIG. 1 shown later is a transverse sectional view of one embodiment of an image-forming apparatus used to practice the method of the present invention. In the drawing, 1 is a recording medium of hollow cylindrical form which is arranged so as to rotate in the direction of an arrow A by a driving means not shown in the drawing. The recording medium 1 is composed of a substrate 2 made of a conductive material and an insulating layer 3 provided outside the substrate. When substrate 2 is produced, for example, with aluminum or its alloys, insulating layer 3 can be formed by applying Alumite treatment to the surface of substrate 2. Generally, insulating layer 3 is formed in a thickness of 2 to 100 μm. 4 is a hopper of which the outlet is provided towards the surface of the recording medium 1, and it contains a magnetic toner 9. 6 is a recording electrode arranged downstream in the direction of rotation of the recording medium 1, and a recording region Z is formed between the tip of recording electrode 6 and the surface of the recording medium 1. Recording electrode 6 is formed on a base plate 5 made of an insulating material such as ceramics by a thick film-forming process, and arranged in parallel with the direction of rotation axis of the recording medium 1. The tip of base plate 5 facing recording region Z is formed in the form of knife edge, and to the portion of knife edge is adhered a blade 7 made of a magnetic material such as an iron plate. Blade 7 is provided in order to concentrate lines of magnetic flux from a permanent magnet 10, positioned in the inside of the recording medium 1, upon the tip of recording electrode 6. 8 is a driving circuit electrically connecting recording electrode 6 with substrate 2, whereby voltage corresponding to an image can be applied between both. 12 is a conductive rubber roller and electrically connected with a bias voltage source 15 for transferring a toner image formed on the recording medium 1 to a recording sheet 11. Both 13 and 14 are fixing rollers.

Next, with reference to the constitution described above, its action will be illustrated. First, magnetic toner 9 supplied to recording region Z from hopper 4 lines in the form of chain along the line of magnetic flux from permanent magnet 10, thereby forming toner chains closing electrical gap which is formed between the tip of recording electrode 6 and the surface of the recording medium 1, i.e. a recording surface. On selectively applying a voltage in accordance with image signals to recording electrode 6 through driving circuit 8, an electrical charge is injected from current flowing through the toner chains into magnetic toner 9, brought into contact with the recording surface, of the toner chains in contact with recording electrode 6 to which voltage has been applied. At the same time, electrical charge having polarity opposite to that injected into said magnetic toner 9 is induced at the boundary between substrate 2 and insulating layer 3 of the recording medium 1. These two opposite electrical charges attract each other by coulomb force. Because of this, magnetic toner 9, into which an electrical charge has been injected, is separated from the toner chains by rotating the recording medium 1 in the direction of an arrow A, whereby a toner image is formed on the recording medium 1 rotating in the direction of an arrow A. On the other hand, the residual toner chains are supplemented with magnetic toner 9 from the opposite side of recording electrode 6 with the rotation of the recording medium 1, whereby toner chains are again formed.

At the time of rotation of the recording medium 1, it sometimes occurs that a part of magnetic toner 9, although an electrical charge has not been injected into it, adheres to the surface of the recording medium 1 and is carried together with the toner image to a transfer portion, i.e. a portion wherein rotating the recording medium 1 comes near to conductive rubber roller 12. This magnetic toner which has undesirably adhered to the surface of the recording medium 1, because there is no attraction owing to coulomb force between said magnetic toner and the recording medium 1, can easily be, removed by providing a suitable magnetic adsorption means (not shown) downstream of recording region Z in the direction of rotation of the recording medium 1.

When the toner image on the recording medium 1 reaches the foregoing transfer portion, to conductive rubber roller 12 is applied an electrical charge having polarity opposite to that of the magnetic toner from bias voltage source 15 to generate an electrical force. Thus, by this electrical force and pressure of the recording medium 1 applied to recording sheet 11, the toner image is transferred to recording sheet 11 moving in the direction,. of an arrow B. The transferred image is then fixed when recording sheet 11 passes between fixing rollers 13 and 14.

In the image-recording method described above, the present inventors have worked to obtain a good-quality image with particular emphasis given to the magnetic toner, and consequently have found that good results are obtained by limiting both the bulk resistance and surface resistance of the magnetic toner to particular ranges! The results of the study are shown below.

The following materials:

styrene/n-butyl methacrylate copolymer ($Mw=25\times10^4$, $Mn=3\times10^4$) 36 parts by weight polypropylene (Bischol 550 P produced by Sanyo Chemical Co., Ltd.) 4 parts by weight magnetite (EPT500 produced by Toda Kogyo K.K.) 1 60 parts by weight were kneaded for 30 minutes with a kneader equipped with heating rollers, cooled to solidify, pulverized and classified to obtain a magnetic toner having a particle size of 6 to 20 μm. Carbon black (#44 produced by Mitsubishi Chemical Industries Ltd.) was added and uniformly fixed to the surface of the toner particles in a hot air stream of 120° C. Thereafter, 0.5 part by weight of the same styrene/n-butyl methacrylate copolymer (average particle size, 0.7 μm) as used above was added as finely divided resin powder to the magnetic toner thus produced. The mixture was mixed with heating in a Henschel mixer to fix said copolymer to the surface of the magnetic toner. As comparative examples, those in which each of carbon black and a hydrophobic silica (Aerosil R972, produced by Nippon Aerosil Co., Ltd.) was added and fixed by itself to the surface of the toner particles were prepared.

Table 1 shows the values of bulk resistance and surface resistance of the magnetic toners obtained with varying amounts of the carbon black and resin powder and the results of developing carried out under conditions described later.

The bulk resistance of the magnetic toner was measured by detecting the resistance of a sample (over 10 mg) contained in a hollow cylinder made of a tetrafluoroethylene resin (Teflon ®) which cylinder has an inner diameter of 3.05 mmφ and was produced by remodeling a dial guage, and applying an electric field of DC 4000 V/cm under a load of 0.1 kg. A 4329-type insulation resistance tester (produced by Yokogawa Hewlett Packard Ltd.) was used to measure the resistance.

The surface resistance was measured by filling a container with the sample, inserting a pair of electrode plates of 1 $cm^2$ in area so as to face each other with an interval of 1 cm therebetween and applying voltage of DC 10 V under substantially no load.

Developing and fixing conditions will now be explained. A dielectric drum which served as the recording medium was produced by coating an Alumite layer of 10 μm in thickness on the outer surface of an aluminum pipe of 40 mm in outer diameter. A rare earth element/cobalt magnet (H18-B produced by Hitachi Metals Ltd.) was positioned in the inside of the dielectric drum. The distance between a needle electrode, which was the recording electrode, and the Alumite layer was made 0.1 mm, and a pulse voltage of +50 V was applied to the needle electrode to obtain a toner image. This toner image was transferred to plain paper, which is a recording sheet, by applying −100 V to a conductive rubber roller, and then the recording sheet was passed between a fixing roller and a pressing roller at a rate of 50 mm/sec, the fixing roller being heated to 160° C. and the pressing roller being in contact with the fixing roller at a line pressure of 1.0 kg/cm. Thus, the transferred image was fixed on the recording sheet.

ging and yet of good fixability can be obtained. Contrary to this, when the surface resistance is too low (Comparative Example 1), both the image density and resolution degree are low, and yet fogging develops. Further, when the bulk resistance is too high (Comparative Example 2), both the image density and resolution degree lower, and yet fogging develops.

In the above Examples, examples were shown in which carbon black was used as the conductive material constituting the magnetic toner and styrene/acrylate was used as the resin powder. However, other conductive materials (e.g. metallic powders such as nickel, aluminum, etc.) and other resin materials (e.g. other acryl series homopolymers, other styrene/acryl series copolymers, polyethylene series copolymers and vinyl series copolymers) can also be used without being limited to the materials described above. In short, any conductive material and any resin material can properly be selected, so far as there is no generation of chemical reaction between both and neither of them injures the characteristics of other constituent materials.

Examples 11 to 13 and Comparative Examples 3 and 4

A toluene solution of a styrene/n-butyl methacrylate copolymer (resin content, 60 wt. %) used in Example 1 was prepared. This solution and the toner particle, to the surface of which the carbon black was fixed, used in Example 1 were added to a Henschel mixer and mixed under reduced pressure to obtain a magnetic toner. Using this magnetic toner, developing and fixing were

TABLE 1

| | Carbon black (part by weight) | Resin powder (part by weight) | Bulk resistance (Ω · cm) | Surface resistance (Ω · cm) | Image density | Degree of resolution (number of lines/mm) | Fogging | Fixability (%) | Overall evaluation |
|---|---|---|---|---|---|---|---|---|---|
| Comparative Example 1 | 2 | 0 | $10^4$ | $10^4$ | 0.4 | 4 | Observed | 85 | x |
| Example 1 | 2 | 0.1 | $10^4$ | $10^5$ | 1.0 | 6.4 | Not observed | 88 | ○ |
| Exapmle 2 | 2 | 0.2 | $10^4$ | $10^6$ | 1.2 | 6.4 | Not observed | 90 | ○ |
| Example 3 | 2 | 0.5 | $10^5$ | $10^7$ | 1.3 | 8 | Not observed | 93 | ○ |
| Example 4 | 2 | 1.0 | $10^5$ | $10^8$ | 1.3 | 8 | Not observed | 94 | ○ |
| Example 5 | 2 | 2.0 | $10^6$ | $10^{12}$ | 1.2 | 6.4 | Not observed | 96 | ○ |
| Example 6 | 2 | 2.5 | $10^6$ | $10^{14}$ | 1.2 | 6.4 | Not observed | 96 | ○ |
| Example 7 | 1.3 | 0.3 | $10^4$ | $10^7$ | 1.3 | 8 | Not observed | 92 | ○ |
| Example 8 | 1.5 | 0.3 | $10^4$ | $10^6$ | 1.3 | 8 | Not observed | 92 | ○ |
| Example 9 | 3.0 | 0.5 | $10^5$ | $10^6$ | 1.3 | 8 | Not observed | 86 | ○ |
| Example 10 | 4.0 | 1.0 | $10^5$ | $10^7$ | 1.3 | 8 | Not | 84 | ○ |
| Comparative Example 2 | Silica 0.5 | 0 | $10^{13}$ | $10^{15}$ | 0.3 | 4 | Observed | 98 | x |

Note 1 Overall evaluation: ○ good, Δ not good, x bad

Note 2 Evaluation of fixability: according to a peeling test of a solid black image using Cellotape ®.

Fixability is expressed by $\frac{\text{density after peeling}}{\text{density before peeling}} \times 100\%$ As is apparent from Table 1, it can be seen that when the bulk resistance of the magnetic toner is $10^6$ Ω.cm or less concurrently, the surface resistance thereof is $10^5$ to $10^{15}$ Ω.cm (Examples 1 to 10), good-quality images of deep density and high resolution degree, free from fogcarried out under the same conditions as in Example 1. Table 2 shows the results of evaluation of images obtained in the same manner as in Example 1 with varying coating amounts of the resin.

TABLE 2

| | Carbon black (part by weight) | Resin powder (part by weight) | Bulk resistance (Ω · cm) | Surface resistance (Ω · cm) | Image density | Degree of resolution (number of lines/mm) | Fogging | Fixability (%) | Overall evaluation |
|---|---|---|---|---|---|---|---|---|---|
| Comparative Example 3 | 2 | 0.05 | $10^4$ | $10^5$ | 1.0 | 6.4 | Not observed | 84 | Δ |
| Example 11 | 2 | 0.1 | $10^5$ | $10^6$ | 1.2 | 8 | Not observed | 88 | ○ |
| Example 12 | 2 | 0.5 | $10^5$ | $10^7$ | 1.3 | 8 | Not observed | 90 | ○ |
| Example 13 | 2 | 1.0 | $10^5$ | $10^8$ | 1.3 | 8 | Not observed | 92 | ○ |
| Comparative Example 4 | 2 | 2.0 | $10^7$ | $10^{10}$ | 1.0 | 6.4 | Observed | 95 | Δ |

The following can be seen from Table 2: Excellent images are obtained in Examples 11 to 13; in Comparative Example 3, the fixability is somewhat inferior since the coating amount of the resin is small; and in Comparative Example 4, since the coating amount of the resin is large, the bulk resistance becomes too large, which results in a little reduction of the image density (as compared with Examples 11-13) and causes considerable fogging.

The present invention has such constitution and action as described above, and therefore in a method of forming toner images directly on the dielectric laminate by means of the recording electrode, there is an effect that high-quality images of both deep density and high resolution degree, free from bleeding and fogging and yet of good fixability, can be obtained.

What is claimed is:

1. A method for recording images comprising:

(a) arranging a recording medium which is composed of a substrate and an insulating layer provided on the surface thereof and yet constituted movably, and a recording electrode in spaced opposing relationship to provide a recording region between the insulating layer and recording electrode, (b) supplying to the recording region a magnetic toner having a bulk resistance of $10^6$ Ω.cm or less and a surface resistance of $10^5$ to $10^{15}$ Ω.cm produced by adding particles of a conductive material to magnetic toner particles comprising a fixing resin and magnetic powders, fixing the particles of the conductive material to the surface of the magnetic toner particles, and then further adding thereto a resin and fixing the added resin to the surface of the magnetic toner particles said added resin being selected to have substantially the same fixability as said fixing resin, and (c) applying electrical signals corresponding to an image to the recording electrode to form the image composed of the toner on the surface of the recording medium.

2. A method according to claim 1, wherein the resin added to the magnetic toner particles is added in the form of powder.

3. A method according to claim 2, wherein carbon black is added as the conductive material in an amount of 0.3 to 4.0 parts by weight based on 100 parts by weight of the magnetic toner particles, and the resin powder is added in an amount of 0.05 to 2.0 parts by weight based on the same.

4. A method according to claim 2, wherein the resin added to the toner particles has an average particle size of 0.01 to 2.0 μm.

5. A method according to claim 2, wherein the resin added to the toner particles has an average particle size of 0.03 to 1.0 μm.

6. A method according to claim 1, wherein the resin added to the magnetic toner particles is added in the form of solution.

7. A method according to claim 6, wherein carbon black is added as the conductive material in an amount of 0.3 to 4.0 parts by weight based on 100 parts by weight of the magnetic toner particles, and the resin is added in an amount of 0.1 to 1 part by weight based on the same.

8. A method according to claim 1, wherein the resin added to the surface of the magnetic toner particles is the same as the fixing resin.

* * * * *